June 1, 1971 — N. G. MURGOLO — 3,581,351
JOINER PIN
Filed April 15, 1969

United States Patent Office 3,581,351
Patented June 1, 1971

3,581,351
JOINER PIN
Nicholas G. Murgolo, 400 Maplegrove Ave., Uniondale, N.Y. 11553
Filed Apr. 15, 1969, Ser. No. 816,298
Int. Cl. A44b 21/00
U.S. Cl. 24—84  7 Claims

ABSTRACT OF THE DISCLOSURE

This invention relates to a pin used to join a pair of drapery units having pin receiving webbing at the top edge thereof.

It is an object of this invention to provide a pin adapted to join a pair of drapery units each having suitable pin receiving webbing therein.

Figure 1:
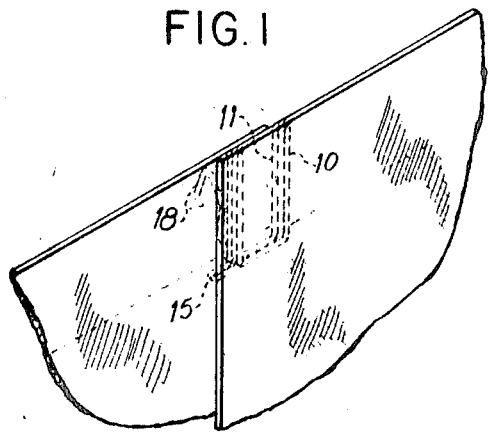
Figure 3:
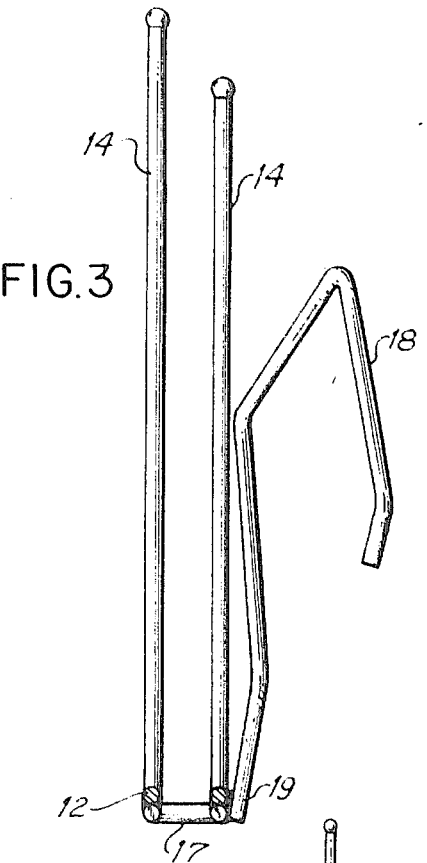
Figure 2:
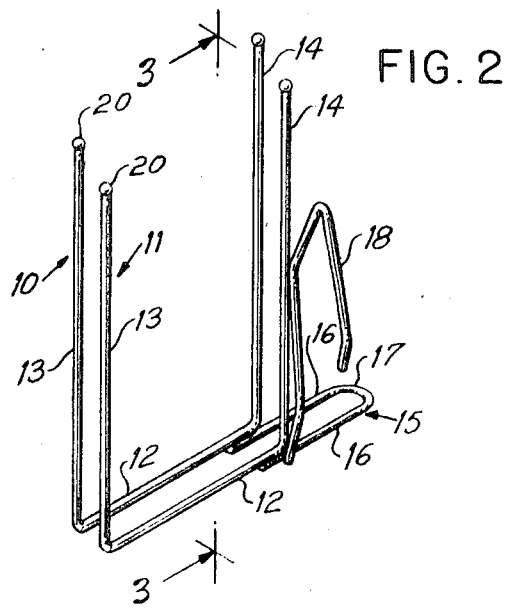
Figure 4:
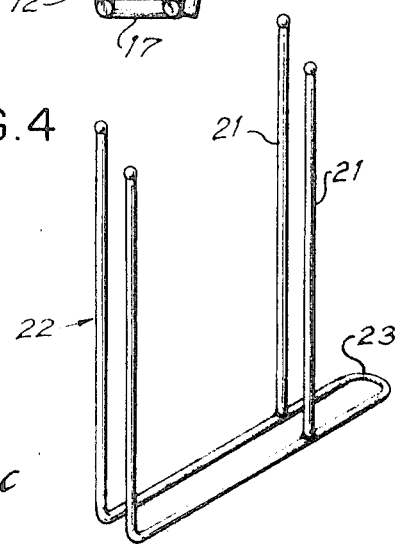
Figure 5:
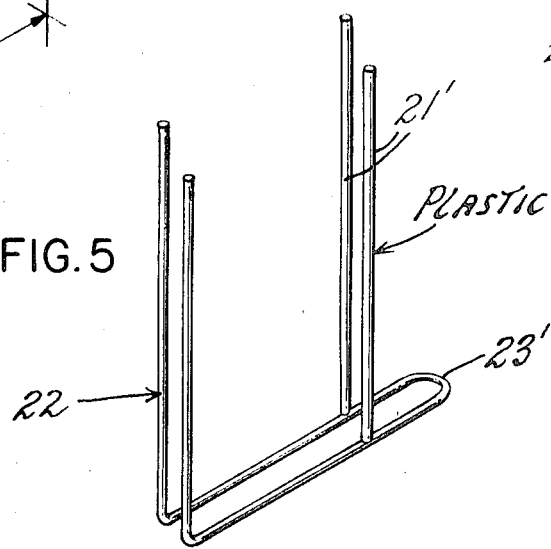

This and other objects of this invention will become apparent upon reading the following descriptive disclosure of an illustrative embodiment shown in the accompanying drawing in which FIG. 1 is a perspective view showing a pair of drapery units joined by the pin of this invention, FIG. 2 is a perspective view of the pin itself, FIG. 3 is a section view taken on line 3—3 of FIG. 2, FIG. 4 is a view of a modified pin having no hook thereon and FIG. 5 is a perspective view of a molded plastic pin.

Turning to the drawing, a pair of integral U-shaped pins 10 and 11, each having a base portion 12 and vertical spaced-apart legs 13 and 14 are disposed in parallel spaced-apart relationship and are joined together at one end by a unique joiner element 15.

The joiner element 15 consists of two sections, a bottom generally U-shaped section 16 having a semi-circular base 17, and a preferably suitably configurated hook 18 having a leg portion 19 is welded to said leg 14 of the pin 11.

The pins 10 and 11 are stamped out of suitable metal wire and are preferably provided with a stamped out top ball 20 on each of the legs 13 and 14.

The joiner elements 15 on each of its legs 16 is spot welded to a respective base 12 of a U-shaped pin 10 and 11 to give a rigid structure.

The joiner pin of this invention is operable without a hanger hook 18 but the preferred form of the pin employs said hook.

FIG. 4 shows a modified form of the invention wherein two straight pin legs 21 are suitably welded to a unique L-shaped parallel spaced-apart element 22 made from an integral rod or wire. Element 22 is unitary and in effect comprises two spaced-apart L-shaped elements joined together by an integral bend portion 23.

The pin of FIG. 4 may be provided with a hook 19, if desired, by spot welding said hook to the base of a leg 21 as shown in FIG. 3.

The joiner pin of this invention may be molded of all plastic material (FIG. 5), in which case there are no weld markings thereon. The legs, element and bend portion have been designated 21', 22' and 23'.

According to this invention, in effect two planar U-shaped pin elements, each having a pair of parallel spaced-apart legs thereon and an integral base are secured at one end of a respective base to a bend attaching means or element. A hook is optionally provided, inasmuch as the joiner pin is operable without a hook thereon.

I claim:

1. A joiner unitary pin for joining a pair of drapery units in suitable webbing thereon consisting of a double pair of planarly disposed U-shaped spaced-apart pins, each having a pair of legs integral with a base portion, the legs thereof being in parallel spaced-apart relationship; and a U-shaped bend attachment means integral with the respective bases of said planar pins at one end thereof whereby said planar pins and said bend means form a rigid joiner pin.

2. The pin of claim 1 comprising a hook fixedly secured to the base of a planar pin.

3. The pin of claim 1 wherein said joiner pin is of integral molded plastic construction.

4. The pin of claim 3 comprising an integral molded hook therein.

5. The pin of claim 1 comprising a pair of separate metal U-shaped pins welded to said U-shaped bend attaching means to form said joiner pin.

6. The pin of claim 5 comprising a hook integral thereto secured to the base of one of said planar pins.

7. A joiner pin comprising a pair of L-shaped elements having a vertical leg and a base portion, U-shaped bend means securing said L-shaped elements at the ends of the respective bases and a leg fixedly secured to the base of each L-shaped element in spaced relationship to the leg of said L-shaped element.

References Cited

UNITED STATES PATENTS 3,224,057 12/1965 Sonntag _____ 242—84C
3,321,814  5/1967 Graber _____ 242—84

GEORGE F. MAUTZ, Primary Examiner

G. A. WALTERS, Assistant Examiner